Figure 4:
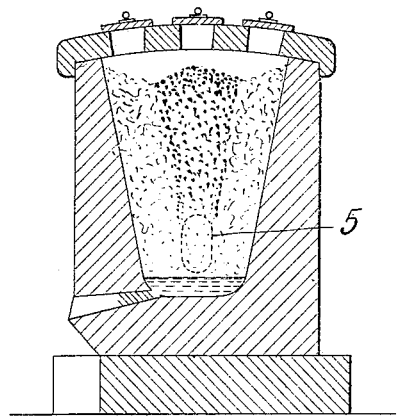

No. 863,044. PATENTED AUG. 13, 1907.
A. J. PETERSSON.
METHOD OF CHARGING ELECTRIC FURNACES FOR PRODUCING CARBID
FROM LIME AND CARBON.
APPLICATION FILED OCT. 30, 1906.
2 SHEETS—SHEET 1.
Fig: 1.
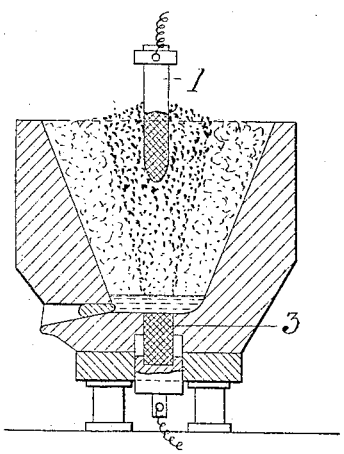
Fig: 2.
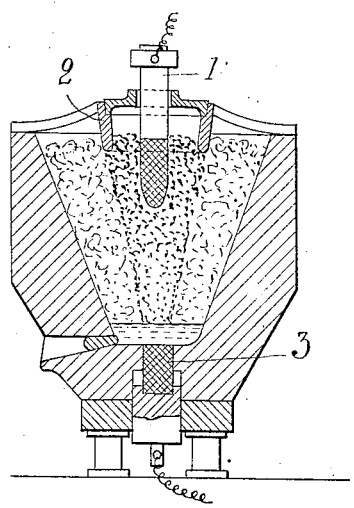
Witnesses.
Inventor.
Albert Johan Petersson
by Henry Orth Jr.
Atty.

No. 863,044. PATENTED AUG. 13, 1907.
A. J. PETERSSON.
METHOD OF CHARGING ELECTRIC FURNACES FOR PRODUCING CARBID
FROM LIME AND CARBON.
APPLICATION FILED OCT. 30, 1906.

2 SHEETS—SHEET 2.

Witnesses.

Inventor.

Albert Johan Petersson,
by
Atty.

UNITED STATES PATENT OFFICE.

ALBERT JOHAN PETERSSON, OF ALBY, SWEDEN.

METHOD OF CHARGING ELECTRIC FURNACES FOR PRODUCING CARBID FROM LIME AND CARBON.

No. 863,044.  Specification of Letters Patent.  Patented Aug. 13, 1907.

Application filed October 30, 1906. Serial No. 341,344.

*To all whom it may concern:*

Be it known that I, ALBERT JOHAN PETERSSON, a subject of the King of Sweden, and a resident of Alby, Sweden, have invented certain new and useful Improvements in Methods of Charging Electric Furnaces for Producing Carbid from Lime and Carbon; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a method of charging electric furnaces for producing carbid from lime and carbon.

In the processes for producing carbid heretofore known it has been considered necessary to uniformly mix the lime with the carbon, to obtain the highest efficiency from the electric current. However, where a mixture of lime and carbon comes in direct contact with the electrodes or at least one of the latter, the result will be that the said electrode or electrodes will rapidly be consumed. As the price of the electrode carbon is much higher than that of the carbon of the charge, the consumption of the electrode carbon for the production of carbid obviously will make the product more expensive than otherwise.

The object of the present invention is to remove the said disadvantage.

The invention consists, chiefly, in charging the furnace with the lime and the carbon in such manner that the carbon will be concentrated to the part of the charge that is in contact with the electrode or electrodes, while the lime is concentrated to the part of the charge that is not in contact with the electrode or electrodes. Experiments have proved that the effective output of the furnace will not be reduced by such a method of charging, while the consumption of the electrodes will be less than when charging carbon and lime uniformly mixed with each other. By concentrating the carbon to the part of the charge that is nearest to the electrode or electrodes which in the usual manner are arranged in such a manner that the path of the electric current runs through the central portion of the charge, the chief part of the current will be consumed in the column of carbon, *i. e.* in the central portion of the charge, which thereby will be heated to such a temperature that the layer of lime in contact with the carbon will be reduced forming carbonic oxid, which flows off, and carbid which melts and may be drawn at suitable intervals. By such a method the heat, moreover, will be better utilized than in the processes heretofore known, the heat being better concentrated to the central portions of the charge than is the case in other processes. A further advantage of the method of charging set forth above is the increased possibility of utilizing in a rational manner the carbonic oxid. Such utilization, however, does not form any part of the present invention.

In the accompanying drawings I have shown some furnaces for carrying out the method.

Figure 3:
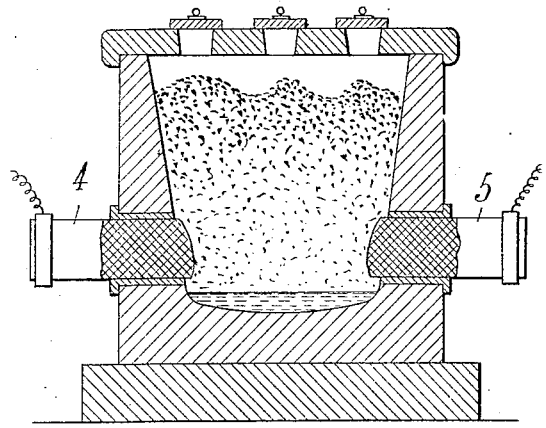

Figures 1 and 2 show vertical sections of furnaces having a central upper electrode and a lower electrode at the bottom. Figs. 3 and 4 show longitudinal section and cross-section respectively of a furnace having horizontal electrodes provided at the ends thereof.

The charging of the furnaces shown in Figs. 1 and 2 is carried out in such a manner that the carbon is placed nearest to and around the upper central electrode 1, while the lime is placed between the carbon and the walls of the furnaces. In order to facilitate such a charging when carried out by hand I may, as is shown in Fig. 2, make use of a hopper 2 which separates the layer of carbon from the layer of lime at the upper surface of the charge. When the charge during the melting process sinks successively and is continually renewed at the top a column will be formed around the upper electrode 1, said column consisting only or chiefly of carbon and extending from the said upper electrode towards the lower electrode 3 or the melted mass accumulating on the bottom. The current is passed through the column of carbon and between the two electrodes 1 and 3, and by reason of the column of carbon decreasing in cross-section from the top toward the zone of reaction, the current density is correspondingly increased through the column of carbon and at the reacting zone.

The furnace illustrated in Figs. 3 and 4 is charged in such a manner that the carbon forms a layer extending centrally from the one electrode 4 to the other 5, while the lime is introduced along the sides of the furnace so that it forms a layer at each side of the layer of carbon. Also in such method of charging the lime will not at all or only in little degree come into contact with the electrodes, whereby the consumption of the latter will be effectively prevented.

Having now described my invention, what I claim as new and desire to secure by Letters Patent is:

1. The process of producing carbid from lime and carbon, which consists in successively introducing the lime and the carbon in an electric furnace in such a manner that the said carbid-forming materials continuously form separate upright columns in close contact with each other; and leading an electric current through the column of carbon for heating the same where the layers of carbon and lime are in direct contact with each other, to a temperature of reaction to form carbid, substantially as and for the purpose set forth.

2. The process of producing carbid from lime and carbon, which consists in successively introducing the lime and the carbon in an electric furnace in such a manner that the carbon continuously forms a central column in the furnace and the lime a column closely surrounding the column of carbon and in direct contact with the same, and leading an electric current through the column of carbon for heating the same to a temperature of reaction where the layers of the said carbon and lime columns that are in direct contact with each other react to form carbid, substantially as and for the purpose set forth.

3. The process of producing carbid which comprises introducing carbid forming base and carbon in separate contacting columns into an electric furnace, passing an electric current through the column of carbon to heat the same to reacting temperature at the surface of contact between the two columns.

4. The process of producing carbid which comprises introducing carbid forming base and carbon in contacting columns into an electric furnace, passing an electric current through the carbon and increasing the current density at the reacting zone by decreasing the cross section of the column of carbon at or near said reacting zone.

5. The process of producing carbid which comprises introducing carbid forming base and carbon in contacting columns one within the other, passing an electric current through the carbon, and increasing the current density in a direction toward the zone of reaction.

In testimony that I claim the foregoing as my invention, I have signed my name in presence of two subscribing witnesses.

ALBERT JOHAN PETERSSON.

Witnesses:
CARL FRIBERG,
EWALD DELMAR.